Patented June 5, 1934

UNITED STATES PATENT OFFICE 1,961,683

SULPHONATION OF SQUALENE AND OIL CONTAINING SQUALENE

Hugh Mills Bunbury, Manchester, Wilfred Archibald Sexton, Huddersfield, and Alexander Stewart, Manchester, England, assignors to Imperial Chemical Industries Limited, a corporation of Great Britain No Drawing. Application May 16, 1931, Serial No. 537,994. In Great Britain May 17, 1930

11 Claims. (Cl. 87—12)

This invention relates to the treatment with sulphuric acid or oleum of oils obtained from the livers of the shark and other elasmobranch fish, with the object of producing products valuable in the textile, rubber and leather industries, and generally useful in the manufacture of emulsions and the like.

It is known that various fish oils, in particular the unsaponifiable portion of certain oils obtained from the livers of elasmobranch fish contain an unsaturated hydrocarbon, to which the names squalene and spinocene are variously given. (See Tsujimoto, Industrial and Engineering Chemistry, 1916 8, page 889; Chapman, Journal of the Chemical Society, 1917, vol. 1, page 56; Heilbron, Kamm and Owens, ibid, 1926, page 1630 et seq.) The proportion of this hydrocarbon present in the unsaponifiable portion of such oils is often very high, i. e. 70% or above.

Our invention is based on the discovery that valuable products are obtained when squalene, or an unsaponifiable oil containing squalene as its chief constituent, is treated with sulphuric acid or "oleum" (i. e. sulphuric acid containing sulphur trioxide), in presence or absence of an organic acid anhydride, e. g. acetic anhydride, at a low temperature, i. e. not exceeding 60° C.

The products of our invention contain sulphur but do not resemble sulphonated oils of the Turkey red oil type. Nevertheless, they possess valuable properties as emulsifying agents, thus they act as emulsifiers in the production of emulsions of the water-in-oil type, and they act favourably e. g. as stabilizers, in the production and preservation of emulsions of the oil-in-water type. It will be understood that the application of our new products in ways whereby we avail ourselves of these properties is also comprised within our invention.

In carrying our invention into practical effect we preferably operate at room temperature, but so low a temperature is not essential.

Our invention is illustrated but not limited by the following examples, in which the parts are by weight.

Example 1

100 parts of a shark liver oil containing about 70% of squalene is cooled to 0° C. and vigorously agitated. 30 parts of concentrated sulphuric acid are now gradually added. A vigorous reaction takes place with evolution of heat. The temperature is kept below 30° C. by appropriate external cooling. As the acid is added, the mixture becomes dark-coloured and very viscous. To the mixture, still with agitation, 300 parts of concentrated brine are added, followed by 300 parts of benzene (or other appropriate solvents). The mixture is allowed to stand and the aqueous layer, which contains the excess of acid, is removed. The solvent layer is washed repeatedly with brine until it is free from mineral acid. The solvent is then removed by distillation and the product remains as a transparent brown heavy oil.

That the product possesses pronounced emulsifying properties is shown by the following:—

(1) A solution of 2.5 parts of the material prepared according to Example 1 dissolved in 95.5 parts of benzene is stirred vigorously and to the solution is added slowly a solution 0.5 parts of glue dissolved in 49.5 parts of water. The aqueous solution is readily emulsified by appropriate means, e. g. by use of a high-speed agitator to give a stable emulsion in which the benzene is the continuous phase and the aqueous liquor the dispersed phase. When a preparation is made under identical conditions except that the product prepared according to Example 1 is absent, there is obtained an unstable emulsion of benzene dispersed in a continuous aqueous phase.

(2) To 159 parts of a neutral tar oil of boiling-range 300 to 360° C. are added 6 parts of the product of Example 1. This solution is mixed with 85 parts of a 10% solution of animal glue and the mixture is converted into an emulsion by appropriate means, e. g. treatment with a high-speed agitator. A highly stable emulsion is obtained capable of being diluted with water to any desired degree without separation taking place. The emulsion is valuable as an insecticidal and fungicidal spray for use in agriculture.

In the absence of the product of Example 1 the emulsion is less readily obtained and is of inferior stability.

Example 2

100 parts of shark liver oil as described in Example 1 are mixed with 30 parts of acetic anhydride. The temperature being kept at 20°, 50 parts of "monohydrate" (100% sulphuric acid) are added. The product is isolated in a similar way to that of Example 1, from which it does not differ in any essential respect.

Example 3

To 50 parts of shark liver oil as described in Example 1 10 parts of 10% "oleum" are added, the temperature being kept at 20°. The product is isolated as described in Example 1.

Example 4

To 20 parts of squalene (cf. Heilbron, Kamm and Owens, loc. cit.) is added 8 parts of sulphuric acid as described in the preceding examples. The product is isolated as already described and possesses properties similar to those of the preceding examples.

Throughout the specification and claims it will be understood that the term "unsaponifiable" has its accepted meaning in the art; that is, by "unsaponifiable matter" is meant substances which are insoluble in water or do not combine with caustic alkalis to form soluble soaps (cf. J. Lewkowitsch, "Chemical Technology and Analysis of Oils, Fats and Waxes", volume I, 1904, page 293).

As many apparently widely different embodiments of this invention may be made without departing from the spirit and scope thereof, it is to be understood that we do not limit ourselves to the specific embodiments thereof except as defined in the appended claims.

We claim:—

1. In a process of producing sulphur-containing substances useful as emulsifying agents, the steps which include reacting an unsaponifiable oil comprising principally squalene with an excess of a sulphonating or sulphating agent at a temperature not exceeding about 60° C., and separating the organic sulphur-containing reaction products from the excess of sulphonating or sulphating agent.

2. In a process of producing sulphur-containing substances useful as emulsifying agents, the steps which include reacting an unsaponifiable oil comprising principally squalene with an excess of a sulphonating agent or greater sulphonating power than 100% sulphuric acid at a temperature not exceeding about 60° C., and separating the organic sulphur-containing reaction product from the excess sulphonating agent.

3. The process of producing sulphonated derivatives which comprises treating an oil comprising substantially squalene with 100% sulphuric acid and acetic anhydride at a temperature not exceeding about 60° C., salting out the oily product, and removing the same in solution in an added organic solvent.

4. As a new product of manufacture, a sulphur-containing reaction product of an unsaponifiable oil comprising principally squalene with a sulphonating or sulphating agent at temperatures not exceeding about 60° C. and from which the free sulphonating or sulphating agent has been separated, said product being especially useful as an emulsifying agent.

5. As a new product of manufacture, a sulphur-containing reaction product of the unsaponifiable portion of the liver oil of squaloid sharks comprising principally squalene with an excess of a sulphonating or sulphating agent at temperatures not exceeding about 60° C. and from which the free sulphonating agent has been separated, said product being especially useful as an emulsifying agent.

6. As a new product of manufacture, a sulphur-containing reaction product of an unsaponifiable oil comprising principally squalene with a sulphonating agent of greater sulphonating power than 100% sulphuric acid at a temperature not exceeding about 60° C., and from which the free sulphonating agent has been separated.

7. As a new product of manufacture, a sulphur-containing reaction product of an unsaponifiable oil comprising substantially squalene with an excess of a sulphonating or sulphating agent at a temperature not exceeding about 60° C., and from which the free sulphonating or sulphating agent has been separated.

8. As a new product of manufacture, a sulphur-containing reaction product of an unsaponifiable oil comprising principally squalene with an excess of a sulphonating or sulphating agent and acetic anhydride at a temperature not exceeding about 60° C. and from which the free sulphonating or sulphating agent has been separated.

9. The process which includes reacting an unsaponifiable oil comprising principally squalene with an excess of sulphuric acid at a temperature not exceeding about 60° C., and separating the organic sulphur-containing reaction product from the excess sulphuric acid.

10. A product suitable for use as an emulsifying agent which is a reaction product of an unsaponifiable hydrocarbon oil comprising substantially squalene with an excess of sulphuric acid at a temperature below about 60° C. and from which the free sulphuric acid has been separated.

11. In a process of producing sulphur-containing substances useful as emulsifying agents, the steps which include reacting an unsaponifiable oil comprising principally squalene with an excess of a sulphonating or sulphating agent and acetic anhydride at a temperature not exceeding about 60° C., and separating the organic sulphur-containing reaction product from the excess sulphonating or sulphating agent.

HUGH MILLS BUNBURY.
WILFRED ARCHIBALD SEXTON.
ALEXANDER STEWART.